(12) United States Patent
Piech

(10) Patent No.: US 11,365,024 B2
(45) Date of Patent: Jun. 21, 2022

(54) METALLIC CAN LID

(71) Applicant: Gregor Anton Piech, Ellmau (AT)

(72) Inventor: Gregor Anton Piech, Ellmau (AT)

( * ) Notice: Subject to any disclaimer, the term of this patent is extended or adjusted under 35 U.S.C. 154(b) by 102 days.

(21) Appl. No.: 16/603,008

(22) PCT Filed: May 12, 2017

(86) PCT No.: PCT/EP2017/061474
§ 371 (c)(1),
(2) Date: Oct. 4, 2019

(87) PCT Pub. No.: WO2018/184704
PCT Pub. Date: Oct. 11, 2018

(65) Prior Publication Data
US 2020/0031521 A1 Jan. 30, 2020

(30) Foreign Application Priority Data

Apr. 5, 2017 (EP) ...................... 17165040

(51) Int. Cl.
*B65D 17/40* (2006.01)
*B65D 17/28* (2006.01)

(52) U.S. Cl.
CPC .. *B65D 17/4014* (2018.01); *B65D 2517/0013* (2013.01); *B65D 2517/0038* (2013.01); *B65D 2517/0046* (2013.01); *B65D 2517/5078* (2013.01)

(58) Field of Classification Search
CPC ............ B65D 17/4014; B65D 17/4012; B65D 17/4011; B65D 17/401; B65D 1/44; B21D 51/46; B21D 51/44; B21D 51/383; B05B 7/227

USPC ............... 220/270, 269, 268, 266, 265, 212; 413/18, 14, 12, 9, 8
See application file for complete search history.

(56) References Cited

U.S. PATENT DOCUMENTS

| 2,122,537 A | * | 7/1938 | Pfeffer, Jr. | ............. B21D 51/44 413/18 |
| 3,747,797 A | * | 7/1973 | Gayner | ..................... B32B 3/26 220/270 |
| 3,861,976 A | * | 1/1975 | Gayner | ............. B65D 17/4012 156/257 |
| 3,883,035 A | * | 5/1975 | Rentmeester | .......... B21D 51/44 220/270 |
| 4,108,330 A | * | 8/1978 | Patterson | ............. B65D 17/505 220/260 |
| 4,170,314 A | * | 10/1979 | Weierman | ............... B29C 70/74 220/260 |

(Continued)

FOREIGN PATENT DOCUMENTS

DE 102010013531 A1 10/2011
EP 0008191 A1 * 2/1980 ........... B65D 17/401
(Continued)

*Primary Examiner* — Robert J Hicks
(74) *Attorney, Agent, or Firm* — Vivacqua Law, PLLC

(57) ABSTRACT

A reclosable can lid is described which does not require a separation of a metal surface associated with chip formation in the opening process, which ensures the respective required leak tightness on the reclosing, even in the case of a pressure build-up resulting in the respective container, and which has a high functional reliability with a particularly economical manufacturing option.

15 Claims, 3 Drawing Sheets

Detail C

(56) References Cited

U.S. PATENT DOCUMENTS

| | | | | |
|---|---|---|---|---|
| 4,461,605 A | * | 7/1984 | Stanek | B65D 53/08 |
| | | | | 413/8 |
| 4,513,876 A | * | 4/1985 | Buchner | B65D 17/4012 |
| | | | | 220/270 |
| 2018/0002065 A1 | | 1/2018 | Thielen et al. | |
| 2018/0016058 A1 | | 1/2018 | Thielen et al. | |
| 2019/0055053 A1 | * | 2/2019 | Piech | B65D 17/4014 |
| 2019/0241309 A1 | * | 8/2019 | Piech | B65D 17/404 |

FOREIGN PATENT DOCUMENTS

| | | |
|---|---|---|
| EP | 1607341 A1 | 12/2005 |
| EP | 2354022 A1 | 8/2011 |

\* cited by examiner

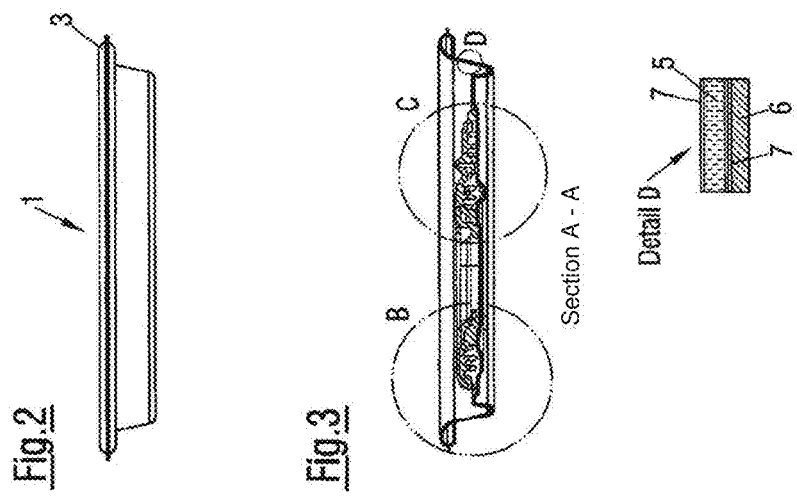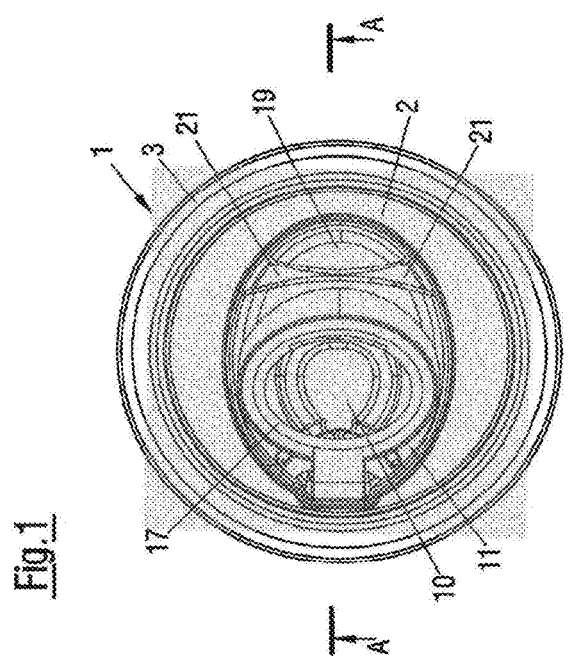

METALLIC CAN LID

CROSS REFERENCE TO RELATED APPLICATIONS

This application is a national stage application under 35 U.S.C. 371 of PCT Application No. PCT/EP2017/061474 having an international filing date of 12 May 2017, which PCT application claimed the benefit of European Patent Application No. 20170165040 filed 5 Apr. 2017, the entire disclosure of each of which are hereby incorporated herein by reference.

TECHNICAL FIELD

The present invention relates to a metallic can lid having a reclosable opening, in particular for beverage cans and for containers for storing foods and other liquid, pasty, powdery and/or solid products.

INTRODUCTION

A can lid having a reclosable opening is known from EP 1 607 341 A1 in which an opening is introduced in the metallic can lid and the margin of this opening is beaded to provide an anchorage possibility for a prefabricated plastic closure part. The plastic closure part encloses a base part which is to be connected to the bead margin of the can opening and in which an opening closed by a flat stopper is formed. The flat stopper is connected to the opening margin via a plastic tear seam so that the flat stopper connected to a tear tab can be released from the plastic base part via the tear tab by exertion of a pull and can be pivoted into an open position. The opening can be temporarily closed again by pressing in the flat stopper which is preferably conical at its lower side.

Reclosable can lids are furthermore described in DE 10 2010 013 531 A1 and EP 2 354 022 B1, for example.

Finally, a reclosable can lid is known from DE 10 2015 112 428 A1 of the applicant on which the present invention is based and which is intended to be substantially improved by the invention.

SUMMARY

It is therefore the object of the invention to design the known reclosable can lid such that its production is possible in an even more economic manner, the construction design is simplified, material savings can be achieved and the function is in this respect simultaneously improved.

This object is substantially satisfied by a metallic can lid having a microgap which extends peripherally, which is provided in the metallic lid surface and which is sealed off at an inner lid side by a film; having a weakening line extending adjacent to said microgap in the film; having a sealing frame composed of a plastic material which is connected to the fixed lid surface and which surrounds the opening region; having a closure unit composed of a plastic material which is connected to the metallic lid region which is disposed within the microgap and which can be pivoted open, said closure unit being pivotably attached to the fixed lid surface and being provided with a tear-open member disposed diametrically opposite the pivot bearing region, wherein the sealing frame and the closure unit cooperate via sealing and latching ribs and associated receiving grooves and the metallic lid region disposed within the annular microgap is received and held in the opening region of the lid, in particular in a shape matched and/or force transmitting manner and in particular without a toothed arrangement; and wherein the film provided at the inner lid side and covering the microgap consists of a molded part, in particular a deep-drawn molded part, which reproduces the lower side structure of the can lid forming a continuous metallic surface; and wherein both the sealing frame is connected to the fixed lid surface in a bonded manner and the closure unit is connected to the metallic lid region that can be pivoted open in a bonded manner, in particular by a thermal process using an adhesive lacquer layer which is preferably suitable for use with food and/or has lubricating properties.

Due to the interplay of the individual features of the can lid in accordance with the invention, it becomes possible to accommodate and to fasten both the sealing frame and the closure unit in a space saving manner and preferably in a recess of the can lid surface at the upper side of the can lid and thus to avoid the apertures of the can lid surface required in known designs. This also brings about advantages with respect to hygiene, in particular in connection with the further special feature of the invention which comprises that the closure unit has at its total outer periphery a sealing apron which extends up to the fixed lid surface and which is preferably connected to the fixed lid surface in a bonded manner via the adhesive lacquer layer.

It can be ensured in this manner that the plastic elements disposed at the outer lid side cannot be infiltrated by contaminants and the like.

The lower side of the metallic can lid disposed at the inner can side and formed by a practically continuous metal surface only including the microgap is in turn connected in a bonded manner via the adhesive lacquer layer to the molded plastic film part which ensures the sealing off of the microgap, with it being important that no plastic parts belonging to the closure unit or to the sealing frame extend through the metallic lid material and, accordingly, only two components come into contact with one another and have to be connected at the lower lid side, namely the metallic lid, on the one hand, and the molded plastic part, on the other hand.

The preferred use of a joining together of the lid region that can be pivoted open without a toothed arrangement and/or without undercuts is furthermore of advantage, said lid region first being punched out from the lid surface and then being pressed back into the lid surface again, wherein the recognition is used that the punching out process can be designed such that a conical expansion can be achieved in the lid material over a part region of the material thickness, said conical expansion enabling a shape matched and/or force transmitting connection between a fixed lid surface and a punched out lid region with a formation of the desired microgap.

The bonded connection can in particular comprise a plastic weld connection, with the adhesive lacquer serving for an adhesive promotion between the plastic and the metal, or a so-called hot melt connection.

The sealing frame, the closure unit and the molded film part are preferably exactly mutually aligned with respect to the metallic lid surface by means of positioning studs which are preferably point-shaped and associated recesses which are in particular cup-shaped.

While the studs for the plastic parts positioned at the outer side of the can lid are preferably formed at this plastic part, the cup-shaped recesses for receiving the studs of the sealing frame at the lower side or inner side of the lid simultaneously act as studs for positioning the molded plastic part which has correspondingly complementary recesses.

The finished can lid preferably comprises a composite material in the form of a sheet metal layer, in particular composed of aluminum or tin plate, which is coated at both sides by an adhesive lacquer and which is connected at the inner side to the film molded part via the adhesive lacquer layer, wherein the mechanical strength of the film component in the composite material is expediently selected such that, while ensuring the required overall strength of the composite material, the material thickness of the metallic component can be reduced, in particular by at least 1%, in comparison with a film-free component.

In view of the huge volume of can lids produced in practice, such a saving of material, even if only amounting to 1%, for example, already plays a comparatively large role under economic aspects and accordingly represents a corresponding advantage.

In accordance with a further embodiment of the invention, the molded film part of the composite material extends up to and into the bead margin which is provided for connecting the lid to a can and which acts there as a sealing material and as corrosion protection.

Since additional sealing material is typically required in the region of the bead connection in conventional cans, a practically relevant saving and a cost reduction can in turn be achieved by the measure in accordance with the invention.

The pivot bearing region molded at the closure unit has, between its fastening region and the pivot part, a hoop region which is closed at the lid side, which expands in a gusset-like manner at both sides, which acts as a tilt spring and which enables a bistable positioning of the closure unit. This arrangement ensures that the closure unit is moved to an opening angle of more than 130° and is held open in this position when an opening angle of approximately 90° is exceeded, whereas the closure unit snaps back from the open position to an opening angle position of less than 30° on a falling below of an opening angle of approximately 90°. From this position, the closure unit can again be pressed into the sealing closed position without problem. This process can be carried out reversibly in both directions a multiple of times.

The configuration of this region, acting as a tilt spring, closed at the outer side is also important in this respect since the gaps which are frequently present in conventional solutions and which are prone to contamination are thereby avoided.

The embodiment of the sealing frame and the closure unit is of particular significance for the function of the reclosable can lid in accordance with the invention. The sealing frame and the closure unit cooperate via an inwardly disposed sealing rib and an outwardly disposed latching rib which engage into corresponding receiving grooves. A predefinable sealing pairing of slanted surfaces is in this respect provided between the sealing rib and a wall of the associated receiving groove, with the selection of the slant being dependent on which inner can pressure has to be maintained after the reclosing of the can has taken place, wherein it must simultaneously be taken into consideration that the opening process is not thereby made more difficult in a disruptive manner.

The latching rib is provided with a short slanted surface lug which cooperates with a counter-latch of the associated receiving groove, with a predefinable clearance being provided between the two cooperating surfaces when the can opening is closed.

This small clearance can be used to enable an excess pressure reduction during the opening movement of the closure unit without the lid already being opened so far in this phase that there would be a risk of a spurting out of liquid.

A further special feature of the invention that is important with respect to the constantly sought reduction of the production costs of can lids is that the can lid at least substantially comprises the same aluminum alloy as the container part connected to it; and the metallic material thickness of the can lid is substantially equal to the material thickness of the container part and preferably at least does not exceed twice the value of the material thickness of the container part, with the material thickness of the container part being in a range of approximately 0.1 mm and less.

Known cans, in particular beverage cans, comprise aluminum alloys, with it being typical to use an aluminum alloy of the 3000 series for the cylindrical can part and to use an aluminum alloy of the 5000 series for the lid part to take account of the different technical demands with respect to the can part and the lid part. So far, it has only been possible to reduce the wall thickness of the can wall to approximately 0.09 mm, and indeed by using an aluminum alloy of the 3000 series which is less expensive than the aluminum alloy of the 5000 series which is typically used as the lid material. The wall thickness of the lid material has to be at least twice as large as the material thickness of the can wall to ensure the necessary compression strength of the can despite the notch to be formed in the lid material in known lids for providing a tear-open groove. This notch has a depth which typically corresponds to approximately half the material thickness of the can lid. However, all the demands on the can lid with respect to the opening criteria and the leak tightness can be satisfied by the use of the higher-quality alloy series Aluminum 5000.

In addition to the saving of production costs achieved by the material selection or by the embodiment of the composite material and by weight reduction, it is of considerable importance that, also due to the specific microgap design, it is no longer necessary to use a specific material such as an aluminum alloy of the 5000 series, in particular 5182, for the lid material since an inexpensive aluminum of the 3000 series can now also be used for the metallic lid material.

The invention furthermore relates to a method of manufacturing a sealed opening, which can be torn open or pressed in and can preferably be reclosed, in an areal sheet metal material, in particular in a can lid which is configured as reclosable or which corresponds to a standard can lid in which the opening region can either be torn open or can be pressed into the can interior.

Further details and advantages of the invention are set forth in the dependent claims and will be explained in the following description of an embodiment with reference to the drawing.

BRIEF DESCRIPTION OF THE DRAWINGS

There are shown in the drawing:
FIG. 1 a plan view of a can lid for a beverage can;
FIG. 2 a side view of the can lid in accordance with FIG. 1,
FIG. 3 a sectional view in accordance with the line A-A in FIG. 1,
FIG. 4 an enlarged representation of the detail B in FIG. 3.

DETAILED DESCRIPTION

Figure 4:
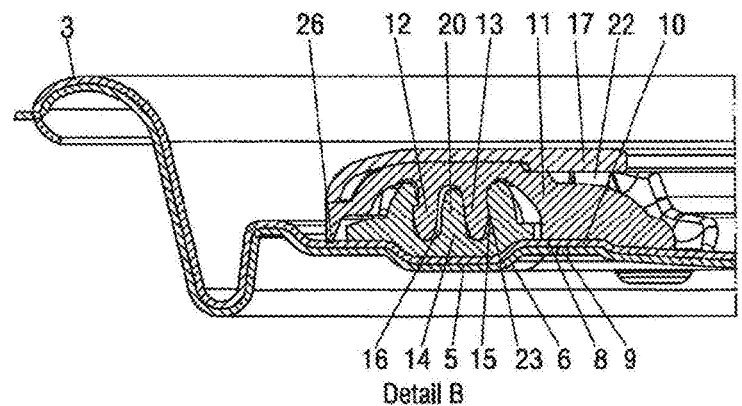

The plan view of FIG. 1 shows a can lid 1 which is in particular intended for a beverage can and into whose lid surface a reclosable opening system is integrated.

A lid region 10 is provided in the can lid for this purpose, said lid region being able to be opened and pivoted upwardly via means that will still be represented and described in detail, and indeed via a pivot bearing region whose fixed part 19 is fastened to the can lid. In this respect, a tilt spring section 21 is provided between this fixed part 19 and a closure unit 11 fixedly connected to the metallic lid region 10 and allows the closure unit 11 to open to more than 130° on an exceeding of an opening angle of approximately 90°, i.e. allows the closure unit to snap into its end open position. If the closure unit falls below an opening angle of approximately 90° in the course of the closing, the closure unit snaps back to an opening angle of less than 30° and the closure unit can again be pressed manually without problem from this part open position into a sealing closed position. This process can be carried out reversibly in both directions a multiple of times.

The can lid 1 is preferably connected to the associated container via a bead margin 3.

The side view of the can lid 1 in accordance with FIG. 1 illustrates that the closure and opening system in accordance with the invention is of such a flat construction that it is received completely within the depth of the lid part and no parts project beyond the lid contour in the closed position.

FIG. 3 shows a section through the lid in accordance with FIG. 1 corresponding to the line A-A, with the detailed regions that are particularly important for the design and function being characterized by B and C which will be explained in detail in the following.

The shown detail D shows the structural design of a main component of the can lid in the form of a composite material in a greatly enlarged manner.

This main component of the can lid comprises a suitably formed sheet metal layer 5 composed of aluminum or tin plate and this sheet metal layer is provided at both sides with a respective adhesive lacquer layer 7 which serves as a bonding agent and which makes it possible to ensure a high-strength and permanent connection in a bonded manner between metal, in particular aluminum, and the plastic of the film 6 which preferably comprises polypropylene, which is provided at the lower lid side, i.e. at the inner can side, and which is suitable for use with food. The mutual connection of the individual components of the composite material preferably takes place in a so-called heat sealing process in which the plastic is partly melted so that a connection results with the metal in a bonded manner.

Although the material thickness of the metallic can lid part can already be reduced due to the use of the microgap technology already described in the introduction in contrast to can lids having a tear line that can be torn open, it is of advantage to use the described composite material since it allows the composite material to be further reduced without losses with respect to the required strength values of the material thickness of the sheet metal layer and to thereby achieve material and/or cost savings that are significant in practice.

FIG. 4 shows the region B in accordance with FIG. 3 in enlarged form, i.e. the region at which the tear-open member 17 is fastened to the lid part that can be pivoted open, and indeed at its outer margin, such that a lever effect in particular also results on the upward pulling of the lid part due to the elasticity of the lid material and promotes the opening of the lid part.

The molded part contour of the plastic film 6 which is connected to the sheet metal layer 5 in a bonded manner via the adhesive lacquer layer 7 corresponds to the contour of the lower side of the sheet metal part 5 and preferably extends into the bead region 3 where it can simultaneously act as a seal and as corrosion protection.

The lid region 10 that can be pivoted open indicated in FIG. 1 is provided in the can lid material 5 and, in accordance with the invention, is not bounded by a material weakening as in the typical prior art, but rather by a microgap 8. This peripheral microgap 8 is preferably formed in that the lid region 10 is punched out from the sheet metal material and is subsequently pressed back into the opening again and is held by clamping such that a planar metal surface is in turn present and the metallic lid provided with an adhesive lacquer layer at both sides can again be handled as a uniform part.

Independently of the method specifically used for releasing the lid region that can be pivoted open from the lid material, only one connection formed by a clamping holder is present in the region of the microgap so that, when a can provided with the lid in accordance with the invention is opened for the first time, no metal separation of any kind has to take place and the otherwise unavoidable formation of metallic microparticles is thus excluded. This avoidance of the creation of microparticles in the opening process, in particular microparticles composed of aluminum, is important under health aspects since such microparticles unavoidably also enter into the product contained in the respective can and thus also into the human body.

The microgap 8 which is preferably formed by a straight or curved and non-toothed line is covered at the lower side, i.e. at the inner lid side, by the plastic film and is thus sealed off. The plastic film which preferably comprises polypropylene suitable for use with food has a notch 9 which is adjacent to the microgap and which can peripherally have the same depth or optionally also a different depth and which ensures that only a comparatively small force is required to open the lid. The spacing between the microgap 8 and the notch 9 preferably amounts to approximately double the film thickness, that is, for example, 3 to 4 tenths of a millimeter.

The required opening force is not only dependent on which force is required for separating the connection between the sheet metal layer 5 and the plastic film 6 in the region of the microgap 8, but also on the sealing pairing which is implemented in the cooperation of the sealing frame 14 and the closure unit 11.

The sealing frame 14 composed of a plastic material, in particular polypropylene, surrounds the opening region and, preferably in a recess of the sheet metal layer 5, is fixedly connected to the metallic lid material via the already mentioned adhesive lacquer layer 7. In this respect, it is possible to only provide this fixed connection in the base region of the recess.

The sealing frame 14 has two receiving grooves 15, 16, which are separated from one another by a center web 20, for a latching rib 12 and for a sealing rib 13 that are provided at the closure unit 11. This closure unit 11 likewise comprising a plastic material, preferably polypropylene, is fixedly connected to the metallic lid in an analog manner to the sealing frame 14; however, it is not connected to the fixed-position lid surface 2, but rather to the lid region 10 that can be pivoted open. The lid part that can be pivoted open is thus formed by the metallic lid region 10, which is bounded by the microgap 8, and by the closure unit 11 which is fastened to said metallic lid region at the margin side and at which the tear-open member 17 is also molded.

This tear-open member 17 connected to the outer margin of the closure unit 11 is provided with a holding or fixing element 22 which extends toward the lid part and is easily releasably fixed there such that the intactness of the respective packaging can easily be checked using this connection.

A pivot bearing region 18 molded at this frame is formed at the closure unit 11 disposed diametrically opposite the tear-open member 17 and is fixedly connected to the lid surface disposed outside the lid part that can be pivoted open, which will still be explained with reference to FIG. 5.

Figure 5:
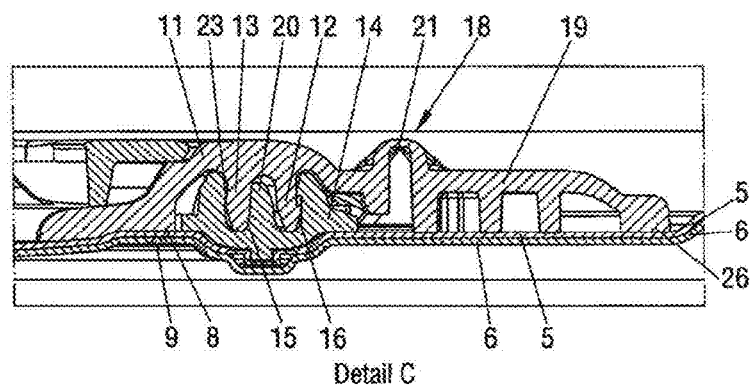
FIG. 5 an enlarged representation of the detail C from FIG. 3.

FIG. 5 shows the detailed region C in accordance with FIG. 3 in an enlarged representation, i.e. the pivot bearing region 18 disposed diametrically opposite the tear-open member 17 in connection with the sealing frame and the closure unit 11 which are in engagement with one another in the manner shown in the closed state of the can lid and form a sealed snap-in latching connection.

The rib 13 received in the receiving groove 16 and the rib 12 received in the receiving groove 15 differ functionally, i.e. separate functions are present at least in part, whereby an optimization of the cooperation of the sealing frame 14 and the closure unit 11 is made possible. The closure unit 11 is connected to the fixed part of the pivot bearing via a bistable tilt spring section 21 integrated therewith. Said tilt spring section holds the lid part, comprising the metallic lid region 10, the closure unit 11 fastened thereto and the tear-open member 17, open at more than 130° on an exceeding of approximately 90° so that the inner space of the respective container is accessible in an ideal manner. On a falling below of approximately 90°, the lid part snaps back to an opening angle of less than 30°. From this open position, the lid part can again be moved or pressed back into the sealing closed position. This process can be carried out reversibly in both directions a multiple of times.

Viewed from above, the pivot bearing region 18 represents a practically closed region, i.e. the gaps and openings are avoided that are frequently present in known solutions, above all in the tilt spring region. However, the further feature of the invention that the closure unit 11 has at its total outer periphery a sealing apron 24, which extends up to the fixed lid surface 2 and which is preferably connected to the lid surface 2 in a bonded manner via the adhesive lacquer layer, is of particular importance under hygienic aspects. It is reliably prevented in this manner that any contamination, moisture and the like can move beneath the plastic elements, i.e. an ideal is achieved under hygienic aspects that is not present in conventional reclosable can lids of this kind. This connection is separated on the first opening.

Figure 6:
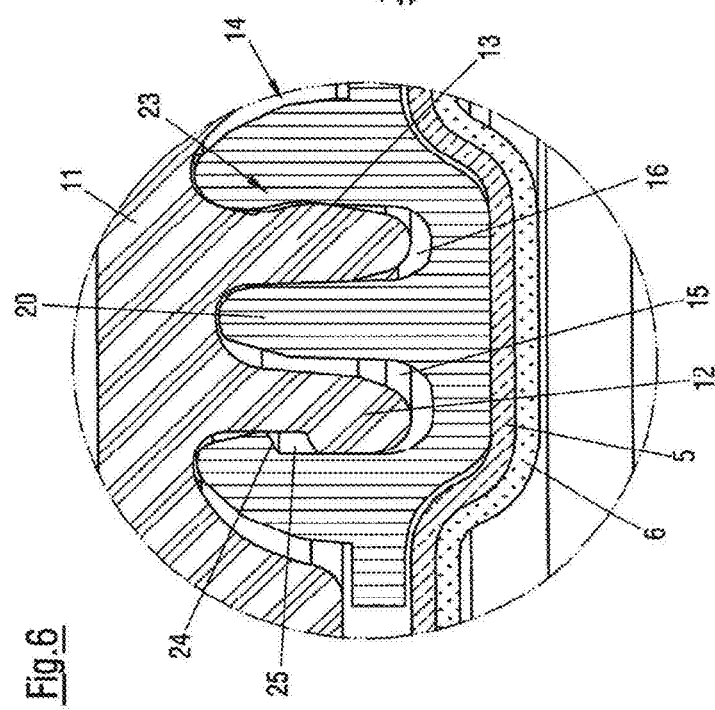
FIG. 6 a further enlarged representation of the detail D from FIG. 5 for explaining the coupling mechanism between the sealing frame and the closure unit.

As can be recognized in the further enlarged detailed representation in accordance with FIG. 6, the sealing rib 13 forms a sealing surface pairing 23 with the receiving groove 16. This sealing surface pairing 23 contributes to the snap-in process in the closing process and holds the closure unit at a defined position in the closed state.

However, the opening resistance can also be set by predefining the inclination of the sealing surfaces of the sealing surface pairing 23 cooperating with one another, i.e. a slanted surface pairing can be selected which ensures that the respective occurring internal pressure is maintained, on the one hand, and that the opening process is not made too difficult, on the other hand.

The latching rib 12 and the associated receiving groove 15 likewise have short slanted surfaces which cooperate with one another and which secure a latching snapping into place, on the one hand, but also a small free relative movement in the form of a clearance 25 between the counter-latch 24 and the short slanted surface provided at the latching rib 12, on the other hand. This free movability can be used to allow a small initial opening movement on a repeated opening of the can lid, in which opening movement a possibly present internal pressure is reduced without the lid already being opened so far that liquid could exit in a possibly disruptive manner.

Figure 7:
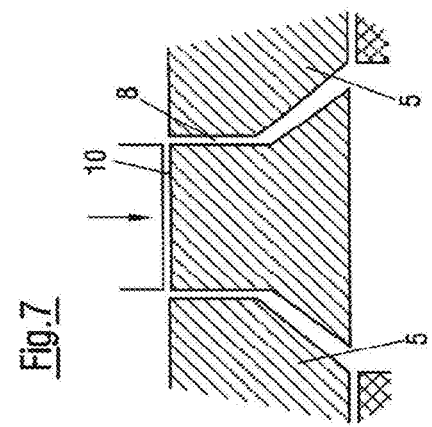
FIG. 7 a schematic representation for explaining the peripheral margin design of the punched part defining the opening region of the can lid.

The schematic representation in accordance with FIG. 7 illustrates a preferably used process of punching out the lid region 10 from the sheet metal layer 5 and the insertion of the punched out region into the opening formed that takes place again subsequently or later. The specifically selected punching out process, i.e. the specific selection of the punch and the die, has the result that the peripheral contour of the punched out region has a smooth cut section and a slanted cut section viewed over its thickness that make it possible or make it easier to press the punched out sheet metal layer region, while forming a microgap, into the punched out opening again immediately or at a later time, and indeed such that the punched out region is held in the opening by a clamping sufficient for the further processing.

A particular advantage results with the described punching process when the coating of the sheet metal layer takes place with an adhesive lacquer layer having lubricating properties since any additional lubricants otherwise required in a punching process are hereby dispensable since the adhesive lacquer layer solely provides the required lubricant in the punching process. This means that a lubricant suitable for use with food is present since the adhesive lacquer layers used in accordance with the invention are suitable for use with food and accordingly no complex and/or expensive cleaning steps are required such as would typically be the case in the event of an otherwise additionally required lubricant.

The punch and the die are preferably selected such that the resulting smooth cut section extends over less than 50% of the material thickness and the remaining slanted cut section expands substantially conically. A sufficient force transmission is thereby achieved when the punched out part is inserted or pressed into the sheet metal layer again and it is no longer necessary to provide specific toothed arrangements or undercuts between the punched out part and the sheet metal layer in order to achieve the necessary holding forces.

The reclosable can lid in accordance with the invention is therefore also advantageous in practical handling since the tear-open member 17 preferably configured as a ring tab is easily accessible, can easily be gripped and enables an opening of the respective can via a pulling movement that can be carried out comfortably. There is the advantage with the reclosing that the complete reclosing can preferably be felt and can additionally be acoustically perceived via the snap-in latching connection.

The can lid in accordance with the invention can be used for all kinds of containers which should be reclosable, with the sealed connection of the can lid to the respective container not only being able to take place via a bead margin, but above all in non-metallic containers also via adhesive connections, weld connections and the like.

The invention is further directed at a method of manufacturing a sealed opening, which can be torn open or pressed in and can preferably be reclosed, in an areal sheet metal material, in particular in a can lid, such as is described in detail in claims 14 to 18.

This manufacturing process which works with a sheet metal layer preferably coated at both sides by an adhesive lacquer layer suitable for use with food is both suitable for the manufacture of can lids of the kind described within the framework of this invention and for the manufacture of standard can lids. In such standard can lids, a two-armed lever member is provided for opening the respective opening region and is fixedly connected to the lid material. The opening region is in this respect configured as a tongue tab which is separated from the lid surface by a microgap which extends over the tab periphery, wherein the tongue tab basis connected to the lid surface forms a kink bearing that becomes effective in the opening process. In this respect, the lower side of the metallic lid is coated or laminated by a plastic film. This film is designed as weakened adjacent to the microgap to ensure an opening of the respective can without problem. If the arrangement is made such that the tongue tab is pivoted into the can interior in the opening process together with the part region of the plastic coating which covers it at the lower side and which is bounded by the weakening line, the weakening line is disposed outside the microgap.

If the arrangement is made such that the tongue tab is pivoted outwardly in the opening process together with the part region of the plastic coating which covers it at the lower side and which is bounded by the weakening line, the weakening line is disposed within the microgap. Details of such standard can lids are described in the German patent application DE 10 2015 122 548.4.

The method in accordance with the invention can be designed in connection with reclosable can lids of the described kind such that the punched out lid part is immediately pressed directly into the sheet metal layer again and is held there in a force transmitting manner by a spring force in the course of a return stroke; however, it is also possible to supply the sheet metal layer, on the one hand, and the punched out part region, on the other hand, separately to further production stages, in which they are connected to the plastic elements required for implementing the reclosable opening, and to subsequently join the two components and to permanently connect them to one another in the present manner already described, wherein the functional reclosable can lid is then obtained.

REFERENCE NUMERAL LIST

1 can lid
2 fixed lid surface
3 bead margin
4 composite material
5 sheet metal layer (aluminum, tin plate)
6 plastic film, molded part
7 adhesive lacquer layer
8 microgap
9 notch
10 lid region, can be pivoted open
11 closure unit
12 latching rib
13 sealing rib
14 sealing frame
15 receiving groove, internal
16 receiving groove, external
17 tear-open member
18 pivot bearing region
19 fixed part of the pivot bearing, fastening region
20 center web
21 tilt spring section
22 fixing element
23 sealing pairing of slanted surfaces
24 counter-latch
25 clearance
26 sealing apron

The invention claimed is:

1. A metallic can lid comprising:
a reclosable opening;
a microgap which extends peripherally, which is provided in a metallic lid surface and which is sealed off at an inner lid side by a film;
a weakening line extending adjacent to said microgap in the film;
a sealing frame composed of a plastic material which is connected to a fixed lid surface and which surrounds an opening region;
a closure unit composed of a plastic material which is connected to a metallic lid region which is disposed within the microgap and which can be pivoted open, said closure unit being pivotably attached to the fixed lid surface and being provided with a tear-open member disposed diametrically opposite a pivot bearing region,
wherein the sealing frame and the closure unit cooperate via sealing and latching ribs and associated receiving grooves and the metallic lid region disposed within the annular microgap is received and held in the opening region of the lid; wherein the film provided at the inner lid side and covering the microgap consists of a molded part, which reproduces a lower side structure of the can lid forming a continuous metallic surface; and
wherein both the sealing frame is connected to the fixed lid surface in a bonded manner and the closure unit is connected to the metallic lid region that can be pivoted open in a bonded manner.

2. The can lid in accordance with claim 1, wherein at least one of the sealing frame is connected to the fixed lid surface and the closure unit is connected to the metallic lid region by a thermal process using an adhesive lacquer layer.

3. The can lid in accordance with claim 1, wherein the sealing frame, the closure unit and the molded film part are exactly mutually aligned with respect to the metallic lid surface by means of positioning studs and associated recesses.

4. The can lid in accordance with claim 1, wherein the can lid is formed by a composite material in the form of a sheet metal layer which is coated at both sides by an adhesive lacquer and which is connected at the inner side to the film molded part via the adhesive lacquer layer; and
wherein the sealing frame, the closure unit and the pivot bearing region are permanently connected to the sheet metal layer via the outwardly disposed adhesive lacquer layer.

5. The can lid in accordance with claim 4, wherein the mechanical strength of the film component in the composite material is selected such that, while ensuring the required overall strength of the composite material, the material thickness of the metallic component can be reduced in comparison with a film-free component.

6. The can lid in accordance with claim 1, wherein the molded film part of the composite material extends up to and into a bead margin which is provided for connecting the lid to a can and which acts there as a sealing material and as corrosion protection.

7. The can lid in accordance with claim 1, wherein the pivot bearing region molded at the closure unit has, between its fastening region and the pivot part, a hoop region which is closed at the outer side, which expands both sides, which acts as a tilt spring, which moves the closure unit into an open position at an angle of more than 130° after an opening angle of approximately 90° has been exceeded and which moves the closure unit to an opening angle of less than 30° on a falling below of an opening angle of approximately 90°, whereupon the closure unit can be pressed manually from this position into a sealed off closed position.

8. The can lid in accordance with claim 1, wherein the sealing frame has inwardly and outwardly disposed receiving grooves which are each peripheral;
and wherein a peripheral sealing rib is associated with the inwardly disposed groove and a peripheral latching rib is associated with the outwardly disposed groove at the closure unit,
with a sealing pairing of slanted surfaces predefinable in their inclination being provided between the sealing rib and a wall of the receiving groove and the latching rib having a predefinable clearance in an opening direction with respect to a counter-latch in the receiving groove, and/or with a snap-in latching connection having haptic and/or acoustic feedback being formed.

9. The can lid in accordance with claim 1, wherein the notch adjacent to the microgap has a different thickness in its extent, with, for the purpose of reducing excess pressure in a can, the region of the film that is first acted on by the opening force in the opening process has a notch having a larger depth than an adjoining part which has a smaller depth and which is in turn followed by a notch region having a depth which is substantially equal to the notch depth in the initial region of the opening movement.

10. The can lid in accordance with claim 9, wherein the excess pressure reduction takes place during the opening movement of the closure unit within the latching rib clearance.

11. The can lid in accordance with claim 10, wherein the metallic can lid at least substantially comprises the same aluminum alloy as the container part connected to it.

12. The can lid in accordance with claim 11, wherein an alloy of the "Aluminum 3000" series is used as the aluminum alloy.

13. The can lid in accordance with claim 11, wherein the material thickness of the can lid is substantially equal to the material thickness of the container part, with the material thickness of the container part being in a range of approximately 0.1 mm and less.

14. The can lid in accordance with claim 1, wherein the closure unit has at its outer periphery a sealing apron which extends up to the fixed lid surface and which is connected to the lid surface in a bonded manner.

15. A can or a container composed of metal or plastic, wherein a hermetically sealed closure is produced by using the metallic can lid according to claim 1.

* * * * *